March 4, 1941.                C. GENDA                  2,233,944
                                SIGNAL
                    Filed Dec. 14, 1938         3 Sheets-Sheet 2
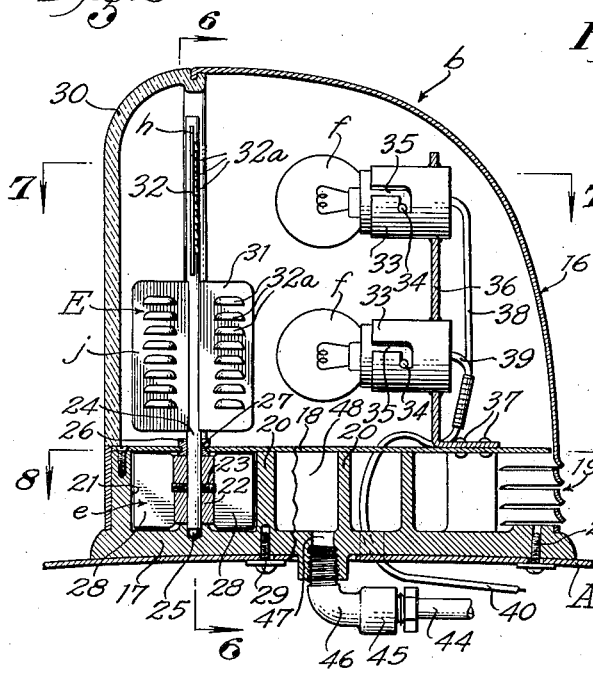
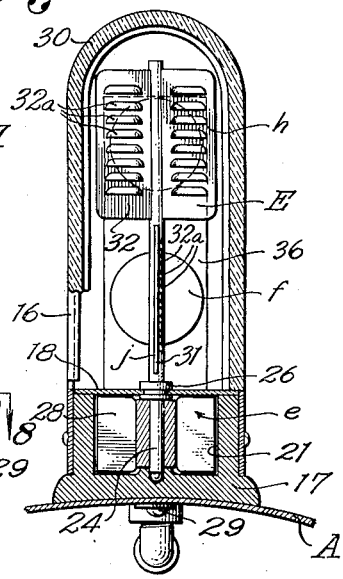
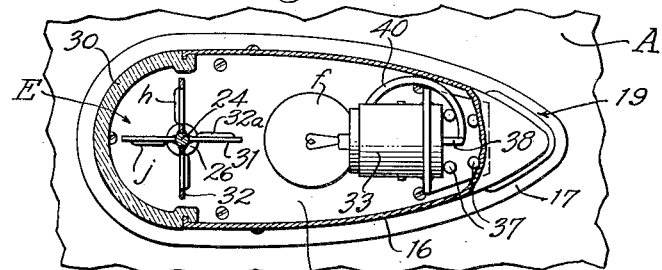
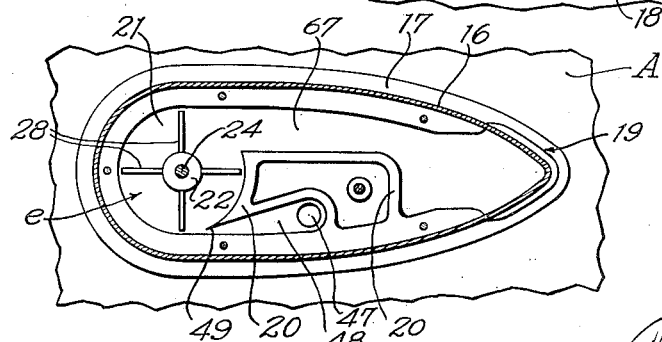
CHUJIRO GENDA,
     INVENTOR.
BY
     ATTORNEY.

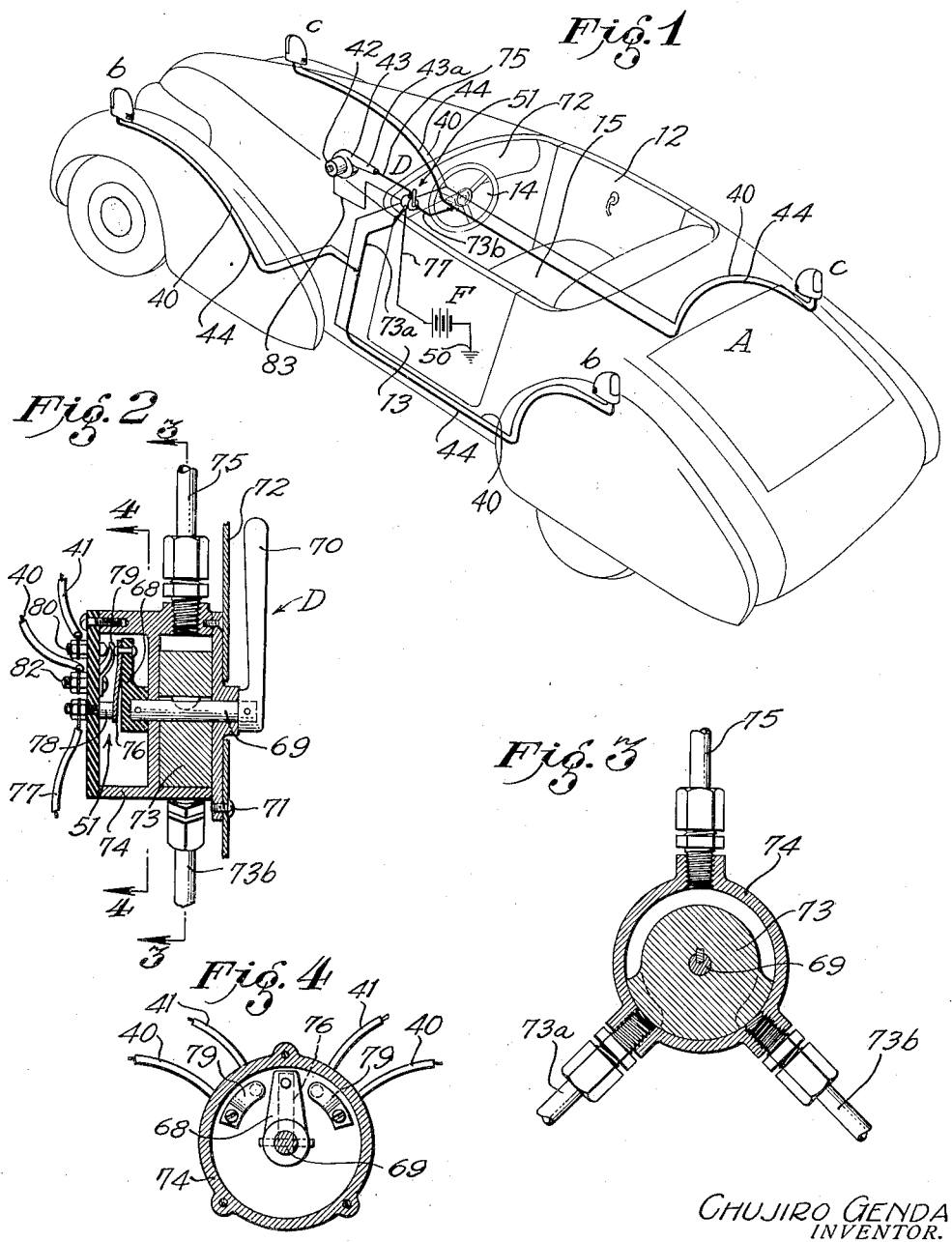

March 4, 1941. C. GENDA 2,233,944
SIGNAL
Filed Dec. 14, 1938 3 Sheets-Sheet 3
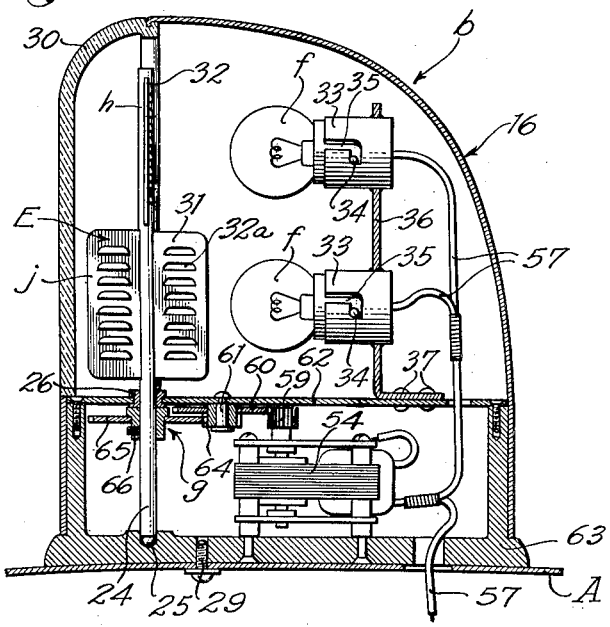
Fig. 9
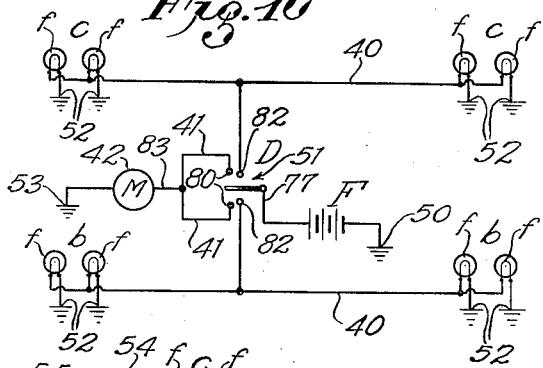
Fig. 10
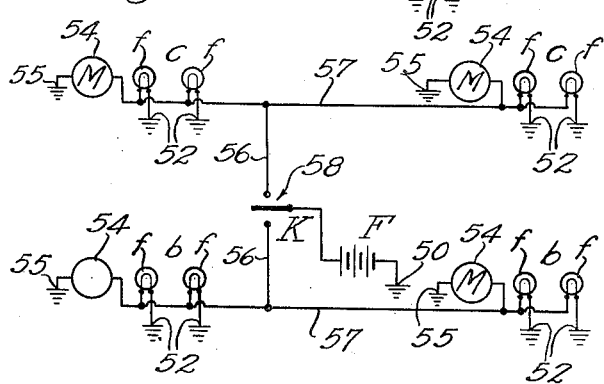
Fig. 11
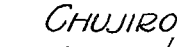
CHUJIRO GENDA, INVENTOR.
ATTORNEY.

Patented Mar. 4, 1941

2,233,944

UNITED STATES PATENT OFFICE 2,233,944

SIGNAL

Chujiro Genda, Beverly Hills, Calif.

Application December 14, 1938, Serial No. 245,636

4 Claims. (Cl. 116—22)

This invention relates to signals, and more particularly to signal lamps for use in traffic, a special use being for the purpose of indicating direction of turning of vehicles. Such road or street vehicles, namely, the usual automobile or truck or bus or the like, are provided with a signal lamp at the rearward part of the car, for indicating, by illumination, the intention to stop the car, such lamp being ordinarily controlled by the operation of the car brake. Various signal means are employed for indicating directional turn of a vehicle, and among these are special accessory lamps. In accordance with the present invention, I carry into effect this directional signalling by providing a forward and rearward lamp at each side of the car, the lamp being organized to intermittently emit its rays for signalling purpose, preferably by the disposal of a light-ray-interruptor provided with suitable means for giving it movement to produce a more or less rapidly interrupted and restored projection of the lamp beam. Preferably each lamp, so preferably disposed both rearwardly and forwardly of the car at each side, includes two sources of illumination; and the signal means and system are so organized that during the interruption of projection of the rays of one source of light there is a momentarily sustained projection of the rays from the other source of light. Various means may be provided for energizing such sources of light and for operating the means for intermittently obstructing the light beams of the separate sources of light at each side of the car, and these are so disposed and interrelated with a control member at the instrument board that the driver of the vehicle may conveniently and speedily throw into operation the signal means at either side of the car and then again interrupt such operation by a likewise reverse similar operation.

The invention has for its object to provide means of the character stated which will be generally superior in point of simplicity and inexpensiveness of construction, taken in conjunction with facility of control, positiveness in action, durability and length of life, and which will be generally superior in efficiency and serviceability.

With the above and other objects in view, the invention consists in the novel and useful provision, formation, combination and association of parts, members and features, all as hereinafter described, shown in the drawings, and finally pointed out in claims.

In the drawings, in which corresponding parts are designated by the same characters in the several views:

Fig. 1 is a perspective view of a conventional type of motor car indicating, in the main diagrammatically, the equipment of same with signal means embodying the invention in a preferred practice thereof;

Fig. 2 is an enlarged, axial section taken through a control member or unit shown in Fig. 1, such control unit acting to set up or terminate action by the signal lamps, and also action of the means for intermittently arresting the beams thereof;

Fig. 3 is a section on a plane at right angles to that of Fig. 2, taken upon the line 3—3, Fig. 2, and looking in the direction of the appended arrows;

Fig. 4 is a similar view taken upon the line 4—4, Fig. 2, and looking in the direction of the appended arrows;

Fig. 5 is an enlarged vertical section of one of the signal lamps shown in Fig. 1, together with fragmentary portions of the means for controlling the illumination thereof and the actuation of the means for affecting the light beams;

Fig. 6 is a sectional view taken upon the line 6—6, Fig. 5, and looking in the direction of the appended arrows;

Fig. 7 is a view in a plane at right angles thereto taken upon the line 7—7, Fig. 5, and looking in the direction of the appended arrows;

Fig. 8 is a similar view taken upon the line 8—8, Fig. 5, looking in the direction of the appended arrows;

Fig. 9 is a modified form of structure with respect to the showing of Fig. 5, and similar in illustration thereto;

Fig. 10 is a diagrammatic view of electrical circuits which may be utilized in operating the first disclosed form of structure; and Fig. 11 is a diagrammatic view of electrical circuits applicable to the disclosure in Fig. 9.

Referring with particularity to the drawings, I have shown at A the body of an automobile of conventional type, having the side doors 12 and 13 and steering wheel 14 forward of the driver's seat 15. At $b$, $b$ I have shown respectively forward and rearward signal lamps on the left side of the car, and at $c$, $c$ respectively I have shown forward and rearward signal lamps at the right side of the car. D designates generally control means for governing the energization of the lamps $b$, $b$ and $c$, $c$, and also the actuation of means E suitably disposed with relation to separate sources of light $f$, $f$ in each lamp $b$ or $c$, so as to intermittently interrupt and restore projection of the signal light beam from said sources *f*. In Figs. 1 to 8, *e* designates means for actuating the means E under control of the means D. In Fig. 9 *g* designates modified means for so actuating the means E similarly through the control D. The means E preferably include separate members *h* and *j* respectively for the light bulbs or separate sources of light *f, f* whereby either one of same is permitted to cast its signal beam uninterrupted while the interruption of the signal beam of the other occurs. This results in the alternate "flicker" of the light projected from the bulbs *f, f*, which flicker may be regulated as preferred, as for example at 200 interruptions per minute, or more or less, as desired.

In the particular embodiment of the invention in part or in whole as generally pointed out in the drawings, I have shown as included in the lamps *b, b* and *c, c*, a casing 16 which may be of any preferred form, and preferably provides a reflecting interior concave surface portion forward of which is disposed a bank of bulbs or other sources of illumination, one above the other, *f*. The casing structure is provided with a substantial base member 17 of Bakelite, or other composition, porcelain or the like, and spaced above this is a horizontal partition 18. Between the members 17 and 18, and at the rear portion of the lamp proper is a louver construction 19. Upright supports 20 for the member 18 range between the members 17 and 18, but in the main the space which they bridge is open, subdivided forwardly of the lamp into a motor chamber 21 in which is installed a vertical motor *e*, comprising a hub 22 fixed as at 23 to a vertical shaft 24 having a step bearing 25 in the base member 17, and a further bearing 26 in the member 18 provided with a gland 27, the shaft 24 being thus maintained in operative upright rotative position in which it ranges upwardly substantially to the crest of the casing 16. Upon the shaft 24 within the chamber 21 are a plurality of blades or paddles 28, impingement of operating fluid upon which causes the rotation of the shaft 24, as hereinafter pointed out. The base member 17 is suitably bolted or otherwise secured, as at 29, to the body A of the vehicle. The forward portion of the casing 16 is provided with a suitable light-passing member 30, of any suitable type for affecting the projected rays from the bulbs *f* either forward or rearward of the vehicle as the case may be, for effective observation by other vehicles or pedestrians upon or approaching the highway traversed by the vehicle so equipped. Somewhat rearwardly of this forward member 30, the shaft 24 rises within and nearly to the top of the casing 16, and is included within the means E, which means further include two vanes 31 and 32 mounted upon said shaft 24, the latter above the former, and disposed at right angles to each other, and projecting each to a substantially equal extent at either side of the shaft 24, and having louver openings 32*a* to reduce air resistance in the rotation of the vanes with the shaft. These vanes are mounted respectively directly in front of the lamps *f*, each of which latter is shown as movably retained within a separate socket 33 by a pin 34 entering a bayonet slot 35, such sockets 33 being mounted in an upright standard 36 secured as at 37 to the partition 18.

The lamps are supplied with electrical energy and in parallel, through lead wires 38 and 39 supplied by a common lead wire 40 extending to the control means D, the bulbs being likewise suitably grounded, and from said control means suitable lead wires 41 extend to an electric motor 42 suitably mounted upon the vehicle body or any convenient part thereof, and which operates a blower 43, the motor also being suitably grounded; and from the blower extends an air pipe 44, coupled as at 45, to a nipple 46 communicating, as at 47, with an elongated air chamber 48 provided within the space between the members 17 and 18 and communicating as at 49 with the motor chamber 21 through a reduced throat portion so as to cause blown air to impinge upon and actuate the vanes 28 and produce rotation, therethrough, of the shaft 24, so as to cause consequent rotation of the vanes 31, at a suitable rate of revolution, say 200 revolutions per minute or less variance thereof as may be preferred. It will be understood that electrical current for the electric motor 42 and for the lamps is supplied from any suitable source, as diagrammatically shown at F in Figs. 1 and 10, there being a single motor 42 and blower 43 for actuating the vanes of the means E of all four lamps, the piping 44 extending from the said blower and suitably disposed in the vehicle, to each one of the lamps. The battery or source of electricity F is suitably grounded, as at 50; and as clearly shown in Fig. 10 the same source of electrical energy supplies the blower and motor and also the lamps on both sides of the vehicle body, a suitable switch 51 being provided for coupling up either right or left-hand pair of lamps with such source of electrical energy and simultaneously coupling up the source of electricity F with the motor 42 of the blower 43.

In Fig. 11, and also in Fig. 10, at 52, is shown the grounding of the bulbs. In Fig. 10 the grounding of the motor is shown at 53. In Figs. 9 and 11 the means E is shown as operated by an electric motor 54 in each lamp, grounded as at 55, and adapted to be energized, in parallel with the bulbs and the respective lamps, and with said bulbs through an electrical path 56 tapped by paths 57 for parallel service to the bulbs of the respective lamps. The lamps on either side of the vehicle, with their motors 54, are thrown into or out of operation by a switch 58 shown in the diagrammatic view of Fig. 11. In this form shown in Fig. 9, the shaft of the motor is provided with a pinion 59 meshing with a gear 60 upon a stub shaft 61 supported by a partition 62 spaced above a base member for the lamp, 63, said gear 60 having fixed thereto a pinion 64 meshing with the gear 65 fixed as at 66 to a shaft 24 carrying vanes 31, 32, within the lamp chamber, and disposed respectively at right angles to each other and forwardly of the bulbs *f, f* in correspondence with the showing first herein described, as, for example, in Fig. 5, each such lamp having the casing 16 and the forward light-passing member 30, the base member 63 being secured as at 29 to some member of the body A of the vehicle.

When the switch 51, as shown in the organization shown in Fig. 5, is thrown in either direction, it will cause the motor 42 to operate the blower 43 and will likewise cause the illumination of the bulb *f* of the lamps *c* or *b* at the respective side of the vehicle as the case may be. When the switch 58 in Fig. 9 is thrown in either direction, it energizes the respective bulbs of the lamps c or b upon that side of the vehicle, and also energizes the two motors of such energized lamps. In all cases, shafts 24 are rotated to rotate the vanes 31, 32, and cause intermittent interruption and restoration of projection of light rays or the light beams from the bulbs f, f, alternately, one bulb always being uninterrupted as to its beam projection while the beam projection of the other bulb is temporarily interrupted. It results that alternate "flicker" of the lamps at that side of the vehicle occurs both forwardly and rearwardly of the vehicle, so that drivers or pedestrians seeing same may act in accordance with the significance of the signal so given, usually with respect to the turning of the vehicle at the side at which such energized lamps give such signals.

It may be pointed out that the discharge of air from the chamber 21 in which rotate the motor vanes 28 occurs through a partitioned air passage 67 which extends to the louver structure 19 at the rear of the casing 16 where such air passes into the open.

The switch 51 is shown in Fig. 2 as including a switch arm 68 mounted upon a shaft 69, having an operating handle 70, all such parts being included within the control means D mounted as at 71 in connection with the instrument board 72 of the vehicle, a three-way valve body 73 with the following features likewise being included in such means D being fixed to the shaft 69 and controlling air pressure pipe lines 73a and 73b extending from the discharge nozzle 43a of the blower 43 to the lamps at the respective sides of the vehicle for actuating the means E in each such pair of lamps under control of the lever arm 70. The valve body 73 is mounted within a casing 74 to which leads a compressed air pipe or conduit 75 which, as stated, directly communicates with the blower nozzle 43a. The piping 73a and 73b is indicated in Fig. 1 in the air distribution system, more or less diagrammatically displayed in said figure.

The switch arm 68 of the switch 51 carries a contact spring 76, which normally contacts with a lead wire 77 leading from the source F of electrical energy, through a binding post 78, and this contact spring 76 is adapted to engage with either one of a pair of spring contact plates 79 in such manner as to energize the electrical paths 41 leading to the blower motor and also paths 40 leading to the pair of lamps at the respective side of the vehicle. These spring contacts cooperate respectively with binding posts 80, with which the lead wires 41, constituting electrical path to the motor are attached, and the spring contacts 79 are carried by binding posts 82 with which are connected the lead wires 40 extending to the lamps at one side of the vehicle, and energized when the switch 51 is thrown in a respective direction.

In Figs. 9 and 11, the control means K include merely the switch 58, and no detail drawing or description of any conventional switch for that purpose is required.

The operation, method of use and advantages of the invention herein described and disclosed in the drawings will be readily understood from such description and drawings, and the statement herein of the actuation and movement of the movable parts and features, without any further separate statement of mode of operation. All that is necessary is to throw the control lever 70 of Fig. 2, or the switch 58 in Figs. 9 and 11, in one direction or the other and the lamps at one side of the vehicle will be illuminated and the predetermined signal given. This signal is given both forwardly and rearwardly of the vehicle, and, due to the "flickering" quality given to the light beams projected from the lamps, such signal is highly effective, attracting and holding attention more effectively than other signals.

It is obvious that many changes and modifications may be made in departure from the specific disclosures of the foregoing descriptions and the drawings, in adapting the invention to varying conditions of use and service, without departing from the true spirit of the invention.

Having thus disclosed my invention, I claim and desire to secure by Letters Patent:

1. A signal lamp comprising a single casing having a light emitting opening, a pair of electric lamps mounted in side to side relationship to each other within said casing, a first movable lamp shield means in said casing between one of said lamps and said opening effective when continuously moved to alternately freely permit and to practically completely deny passage of light from its related lamp through said opening, a second movable lamp shield means in said casing between the other of said lamps and said opening effective when continuously moved to alternately freely permit and to practically completely deny passage of light from said other lamp through said opening, each shield means being effective to permit and deny passage of light from its related lamp only through said opening, said lamp shield means being related to each other so that when either is positioned to practically completely deny passage of light from its related lamp through said opening the other is positioned to permit free passage of light from its related lamp through said opening, and means for continuously simultaneously moving said lamp shield means.

2. A signal lamp comprising a single casing having a light emitting opening, a pair of electric lamps mounted in side to side spaced apart relationship to each other within said casing, a first rotatable vane means in said casing between one of said lamps and said opening and a second rotatable vane means in said casing between the other of said lamps and said opening, each of said vane means having an axis of rotation such that when it is rotated its plane is shifted relative to its related lamp and it is thus rendered effective progressively and alternately to freely permit and to practically completely deny passage of light from its related lamp through said opening, and means for rotating said first and second vane means simultaneously, said first and second vane means being related to each other so that when either is disposed to practically completely deny passage of light from its related lamp through said opening the other is disposed to freely permit passage of light from its related lamp through said opening.

3. A signal lamp comprising a casing having a light emitting opening, a pair of electric lamps mounted in side to side spaced apart relationship to each other within said casing, a rotatable shaft in said casing between said lamps and said light emitting opening and extending in substantially the same direction as a straight line passing through the filaments of said lamps, a first vane means on said shaft disposed in front of one of said lamps and a second vane means on said shaft spaced longitudinally therealong from said first vane means and disposed in front of the other of said lamps, said vane means being disposed relatively to said shaft so that in response to rotation of said shaft their planes are shifted relative to said lamps and each vane thus is rendered effective progressively and alternately to freely permit and to practically completely deny passage of light from its related lamp through said opening, said vane means being angularly related to each other so that when either is disposed to practically completely deny passage of light from its related lamp through said opening the other is disposed to freely permit passage of light from its related lamp through said opening, and means for rotating said shaft.

4. A signal lamp as set forth in claim 3 in which the planes of the vane means are substantially right angularly related to each other and lie substantially in the plane of the axis of the shaft.

CHUJIRO GENDA.